April 21, 1936.  E. F. PULS  2,038,443
BAND BRAKE FOR EPICYCLIC GEARING, FREEWHEEL MECHANISM AND THE LIKE
Filed March 7, 1934  2 Sheets—Sheet 1

April 21, 1936.  E. F. PULS  2,038,443
BAND BRAKE FOR EPICYCLIC GEARING, FREEWHEEL MECHANISM AND THE LIKE
Filed March 7, 1934  2 Sheets-Sheet 2
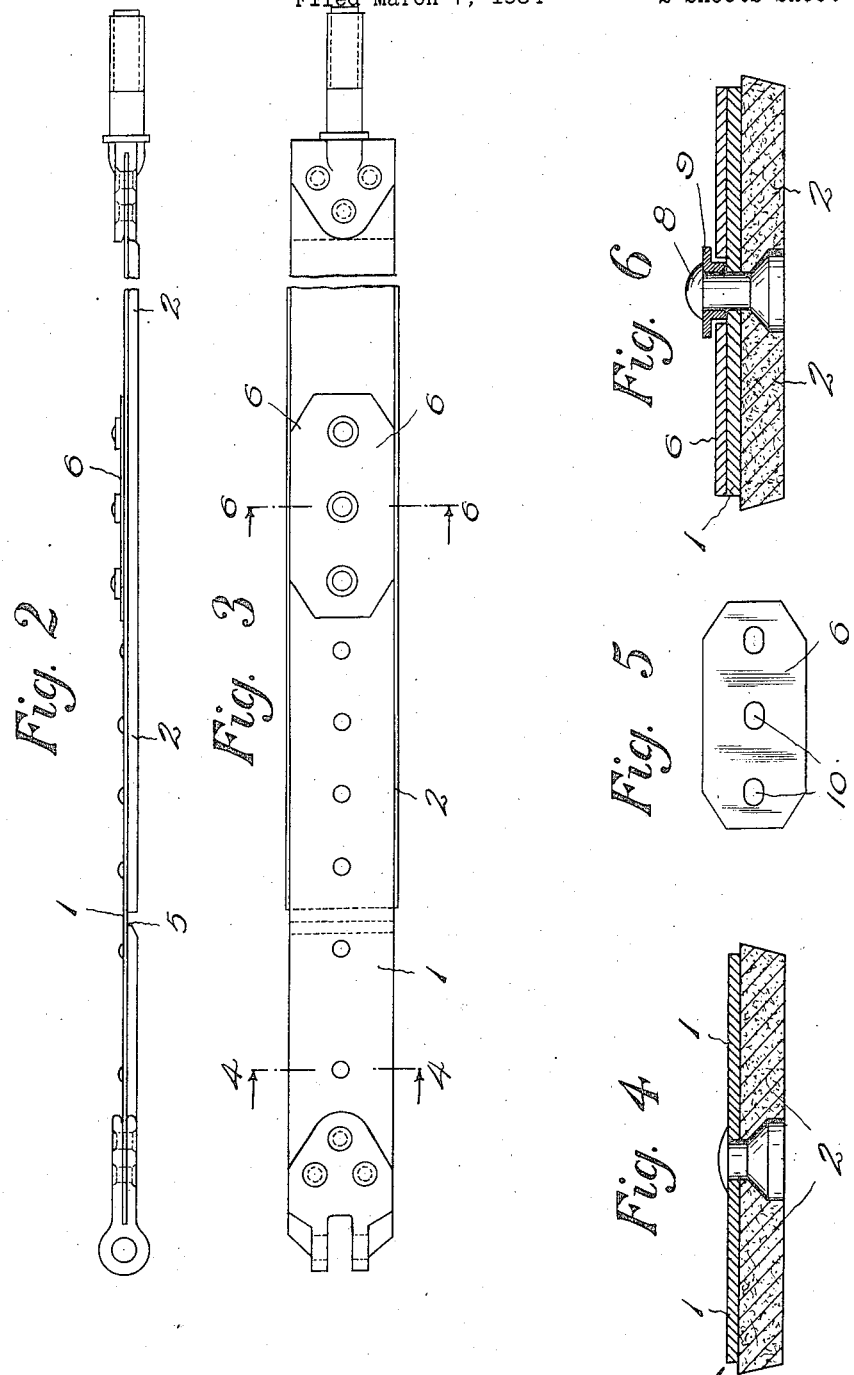

Patented Apr. 21, 1936

2,038,443

UNITED STATES PATENT OFFICE 2,038,443

BAND BRAKE FOR EPICYCLIC GEARING, FREEWHEEL MECHANISM, AND THE LIKE

Erich Friedrich Puls, King's Norton, Birmingham, England

Application March 7, 1934, Serial No. 714,521
In Great Britain March 11, 1933

6 Claims. (Cl. 188—77)

This invention relates to improvements in band brakes for epicyclic gearing, free-wheel mechanism, and the like and refers particularly to band brakes adapted to engage in a peripheral groove in a drum or with an annular surface between spaced flanges.

My invention is particularly applicable for example to band brakes of the type in which a peripheral lubricant-receiving groove in a drum is engaged by a brake band fitting closely within the groove, the brake band consisting of a resilient strip of steel or other metal faced with friction material and having its ends attached to a double-armed lever or toggle for tightening the band to grip the drum.

The band tends in practice to assume an elliptical form with the part of least radius at a point opposite to the operating means so that in the initial engagement of the band it makes contact with the drum at two opposed points only. Thus the band is not positively held in alignment with the groove in the drum as it can rock about these opposed lines of contact with the result that they become point contacts and the part of the band between them rides against the sides of the groove instead of being centered in the groove.

The object of my invention is to provide an improved form of brake band in which this difficulty is overcome in a very simple and effective manner and accurate alignment of the band with the groove in the drum is ensured.

According to my invention there is provided on the part of the band opposite to the operating means to which the ends of the band are connected an auxiliary band or strip of resilient steel or other metal which still allows the band to flex but gives the part of the band to which it is connected a greater resistance to flexing than the remainder of the band. Preferably the reinforcing strip is normally curved to a radius slightly greater than the radius of the drum with which the band engages so that the band tends to assume a pear shape instead of an oval shape. Thus the band when first applied will make contact with the groove in the drum at three points of which one will be opposite the operating means and the others will be angularly spaced from that point at angles of about 120°. This three-point engagement prevents any rocking of the band and ensures its accurate alignment with the groove in the drum at all times.

The reinforcing strip may be secured to the band in any convenient manner which permits the slight necessary sliding movement between the strip and the band as the band flexes. In one convenient practical engagement the strip is connected to the band by rivets secured in the band and having flanged heads engaging in elongated slots in the strip.

One practical form of my invention is illustrated by way of example in the accompanying drawings in which:—

Figure 2 is an edge view of the band in a flat state.

Figure 3 is a plan of Figure 2.

Figure 4 is a section on a larger scale on the line 4—4 of Figure 3.

Figure 5 is a plan of the auxiliary strip alone.

Figure 6 is a section on a larger scale on the line 6—6 of Figure 3.

Figure 1:
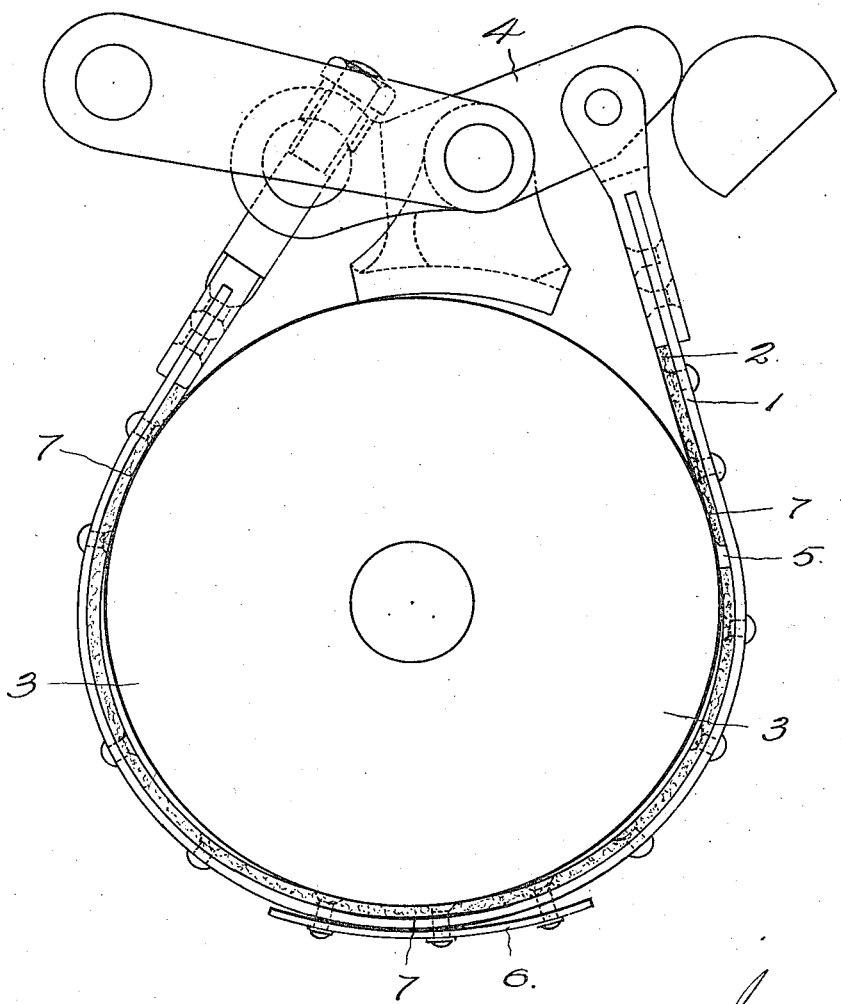
Figure 1 is an end elevation of a drum forming part of an epicyclic change-speed gearing and fitted with my improved brake-band.

In the construction illustrated the brake band consists of a resilient strip 1 of steel or other metal to which a friction facing 2 of suitable material is secured by rivets. The friction facing is adapted to fit closely within a lubricant receiving groove on the periphery of the drum 3 and the ends of the band are attached to a double-armed lever 4 for tightening the band to grip the drum. A gap 5 is left in the friction material at a point adjacent to one end of the band, and this gap acts as a scraper to expel oil from the groove in the drum as the band grips.

According to my invention there is secured to the outer surface of the part of the band opposite the lever 5 an auxiliary strip 6 of steel or other resilient metal which allows the band to flex but gives to the part of the band to which it is connected a greater resistance to flexing. Thus when the band is curved around the drum the part to which the strip 6 is secured is curved to a greater radius than the remainder of the band and the band assumes a pear shape. When the band begins to be applied to the drum it makes contact with the drum at three points indicated at 7, 7, 7, in Figure 1, one of these points being opposite the tensioning means and the others being angularly spaced from that point at angles of about 120°.

The strip 6 is normally curved to a radius greater than that of the drum and is secured to the band by rivets 8 which clamp stepped washers 9 against the band. The reduced parts of these washers extend freely through elongated apertures 10 in the strip to permit the slight necessary sliding movement between the band and the strip as the band flexes. Any other equivalent means for securing the strip to the band may of course be employed.

I claim:

1. A band brake for engagement with the flanged surface of a drum comprising a flexible band fitting around the greater part of the periphery of the drum, means for applying tension to the ends of the band to tighten it on to the drum, and an auxiliary strip of resilient metal curved to a radius greater than that of the drum secured to the part of the band opposite said tensioning means to cause the band to assume a pear shape when free of the drum and to engage the drum at three spaced points as the band is tightened on to the drum.

2. A band brake for engagement with the flanged surface of a drum comprising a flexible band fitting around the greater part of the periphery of the drum, means for applying tension to the ends of the band to tighten it on to the drum, and an auxiliary strip of resilient metal secured to the outer face of the part of the band opposite said tensioning means, said strip being secured to the band by means permitting a limited sliding movement between the band and the strip as the band flexes.

3. A band brake for engagement with the flanged surface of a drum comprising a flexible band fitting around the greater part of the periphery of the drum, means for applying tension to the ends of the band to tighten it on to the drum, and an auxiliary strip of resilient metal secured to the outer face of the part of the band opposite said tensioning means, said strip being secured to the band by rivets secured in the band and passing freely through elongated apertures in the strip.

4. A band brake for engagement with the flanged surface of a drum comprising a flexible band fitting around the greater part of the periphery of the drum, means for applying tension to the ends of the band to tighten it on to the drum, means on the part of the band remote from said tensioning means to flatten said part of the band and urge it towards the surface of the drum, and means for connecting the last mentioned means to the band whereby the band has initial movement independently of the strip and takes movement from the band after the aforesaid initial movement.

5. A band brake for engagement with the flanged surface of a drum comprising a flexible band fitting around the greater part of the periphery of the drum, means for applying tension to the ends of the band to tighten it on to the drum, an auxiliary strip of resilient metal secured to the outside of that part of the band remote from the tensioning means, means for holding the auxiliary strip on the band comprising a fastening carried by the band and loosely extending through the said strip near its ends, the said fastening being longer than the thickness of the strip whereby the said strip has movement independently of the band and its fastenings, said auxiliary strip serving to flatten said part of the band and urge it towards the surface of the drum 6. A band brake for engagement with a peripheral groove in the surface of a drum comprising a flexible steel band fitting around the greater part of the periphery of the drum, a lining of friction material secured to said band, means for applying tension to the ends of the band to tighten it on to the drum, and an auxiliary strip of resilient metal secured to the outside of that part of the band remote from the tensioning means, said auxiliary strip serving to flatten said part of the band and urge it towards the surface of the drum so that as the band is tightened it will first engage the groove in the drum at three spaced points.

ERICH FRIEDRICH PULS.